Aug. 4, 1970 G. H. TOWNER 3,522,528
NONCONTACTING CAPACITANCE DISTANCE GAUGE HAVING
A SERVOSYSTEM AND A POSITION SENSOR
Filed Feb. 27, 1968 3 Sheets-Sheet 1

George H. Towner
INVENTOR.

BY

ATTORNEY

George H. Towner
INVENTOR.

George H. Towner
INVENTOR.

BY

ATTORNEY

United States Patent Office 3,522,528
Patented Aug. 4, 1970

3,522,528
NONCONTACTING CAPACITANCE DISTANCE GAUGE HAVING A SERVOSYSTEM AND A POSITION SENSOR
George H. Towner, Palos Verdes Peninsula, Calif., assignor to TRW Inc., Redondo Beach, Calif., a corporation of Ohio
Filed Feb. 27, 1968, Ser. No. 709,591
Int. Cl. G01r 27/26
U.S. Cl. 324—61   8 Claims

ABSTRACT OF THE DISCLOSURE

A capacitance gauge for precisely measuring small distances of less than 1 mil or on the order of a microinch between the gauge and a dielectric or other surface. The gauge includes two closely spaced electrodes to which an electric high-frequency carrier wave is applied. Additionally, the electrodes are mechanically vibrated with respect to the surface by a subcarrier wave. A servosystem is provided for maintaining constant the average distance between the gauge and the surface. The output signal may be obtained from the servosystem, or alternatively from a position sensor which senses the actual position of the electrodes with respect to the surface.

BACKGROUND OF THE INVENTION

This invention relates generally to measuring instruments, and particularly relates to a capacitance gauge for precisely measuring small distances between the instrument and a surface.

For many purposes a measuring instrument is required for measuring small distances which may be less than 1 mil (one-thousandth of an inch) and which may be on the order of micro-inches (one-millionth of an inch). Gauges are known for this purpose, but usually require that the surface to which the distance is to be determined is electrically conductive or magnetic, or that it reflects light. The capacitance gauge of the present invention does determine small distances to any surface, which need not be electrically conductive or light reflecting. Thus it is possible to measure automatically the distance to a dielectric surface, such as a sheet of polystyrene, while it is being machined, for example, for the purpose of making electric capacitors.

It is accordingly an object of the present invention to measure with high precision the distance of a dielectric object from the instrument which may be on the order of microinches.

A further object of the present invention is to provide a capacitance gauge of the character disclosed which permits to measure the actual distance to a fast-moving or rotating surface even where the frequency component of the output of signal indicating the distance exceeds the bandwidth of the servosystem used for maintaining a constant average distance between the surface and the instrument.

Another object of the present invention is to provide a capacitance gauge capable of measuring a small distance to a dielectric surface regardless of the dielectric constant thereof or of instantaneous changes of the dielectric constant as long as the dielectric constant differs substantially from that of air.

SUMMARY OF THE INVENTION

A capacitance gauge in accordance with the present invention permits to measure relatively small distances which may be on the order of microinches between a surface and the gauge. This surface need not be electrically conducting or magnetic or be capable of reflecting light. The gauge comprises two portions, one of which is fixed while the other one is movable. Two electrodes are closely spaced from each other and are mounted on the movable portion for measuring the distance. A first electric generator develops a carrier frequency which is impressed on the electrodes.

Furthermore, the movable portion of the gauge is mechanically vibrated with respect to the fixed portion. To this end there is provided a second generator for developing a subcarrier frequency which in turn is coupled to suitable means such as an electrically drivable actuator for vibrating the movable portion. This permits to eliminate the effect of stray capacitance which normally exists tween the two electrodes. The value of this capacitance is subject to aging and also varies with temperature. This capacitance may be as large as or larger than that existing between each electrode and the surface to be measured.

A servosystem is also provided for maintaining the average distance between the surface and the electrodes at a constant and predetermined value. The distance to be measured may be obtained from the servosystem, or alternatively it may be derived from a position sensor which is coupled between the fixed and movable portions of the instrument.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
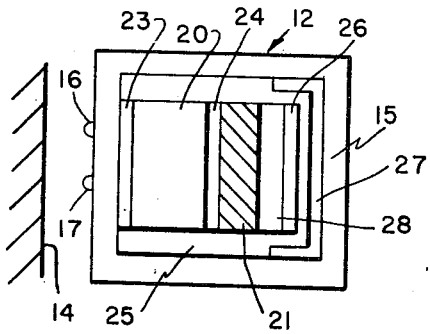
FIG. 1 is a schematic side elevational view of a capacitance distance gauge in accordance with the present invention, including a capacitive position sensor.
Figure 2:
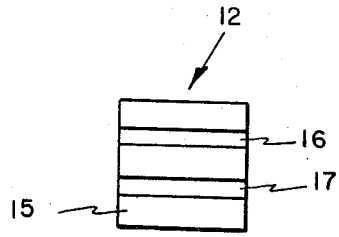
FIG. 2 is a front elevational view of the gauge of FIG. 1.

Referring now to the drawings, wherein like elements are designated by the same reference characters, and particularly to FIGS. 1 and 2, there is illustrated a capacitance gauge in accordance with the invention. The distance gauge generally shown at 12 is designed to measure small distances to a surface such as 14 which may, for example, consist of a dielectric material. Since the gauge is a capacitive instrument it does not touch the surface 14; nor is it necessary that the surface 14 be conductive, magnetic or optically reflecting. In any case the gauge of the invention preferably is designed to measure distances less than 1 mil; the distances may actually be of the order of a few microinches.

To this end the gauge 12 is provided with an electrically insulating bracket 15 on which are mounted two parallel electrodes 16 and 17 which are spaced from each other as shown particularly in FIG. 2. Preferably the electrodes 16 and 17 are spaced from each other by the same order of magnitude as the distance to the surface 14 to be measured. While it is normally not physically possible to construct electrodes spaced only microinches apart, they should be spaced as closely as feasible. Furthermore they should preferably be electrically shielded from each other, for example by an electrically conducting shield. As will be subsequently explained in more detail, an electric carrier wave is impressed on the two electrodes 16 and 17. This carrier wave may have a frequency of, say, 100 kHz. (kilohertz, where one hertz is one cycle per second) to 30 MHz. (MegaHertz.). However, this frequency range is by no means limting but is given by way of example.

Further in accordance with the invention the two measuring or indicating electrodes 16 and 17 are mechanically vibrated at a subcarrier frequency. The subcarrier frequency may, for example, be of some suitable audio frequency such as 1 to 20 kHz. This may be effected by any suitable electrically driven actuator. Such an actuator may be a piezoelectric crystal, a magnetostrictive element or a movable electric coil such as the voice coil of a loudspeaker. Due to the mechanical vibration of the measuring electrodes 16, 17 at the subcarrier frequency, the high-frequency electric field created by the energized electrodes is spatially modulated at the subcarrier frequency.

As shown in FIG. 1, there may be provided a piezoelectric crystal 20 which is mounted on a stationary portion 21 of the gauge 12. It may be considered that the insulating bracket 15 is a movable portion of the gauge with respect to the fixed portion 21 which is illustrated hatched. Thus when the piezoelectric crystal 20 is electrically excited it will vibrate the insulating bracket 15 and accordingly the electrodes 16 and 17. The main purpose of this mechanical vibration is to eliminate the effects of the stray capacitance which exists between the two electrodes 16 and 17. This strap capacitance is subject to variation due to aging or temperature effects and may be of the same order of magnitude as the capacitance between each of the electrodes 16 and 17 and the surface 14.

The piezoelectric crystal 20 may be electrically driven or actuated by a pair of electrodes 23 and 24 covering two opposed surfaces of the crystal. A gap 25 may be provided between the crystal 20 and the insulating bracket 15 as shown.

The position of the electrodes 16 and 17 with respect to the surface 14 may be sensed by means of the piezoelectric crystal 20. In other words, when the voltage applied to the electrodes 23 and 24 is known, the actual position of the crystal 20 with respect to the fixed portion 21 is also known, and hence the position of the electrodes 16 and 17. Thus in a sense the piezoelectric crystal 20 may also assume the function of a position sensor.

However, for greater accuracy and conveniece of the electronic circuitry it may be preferred to have a separate position sensor. To this end there is shown in FIG. 1 a pair of electrodes 26 and 27. Electrode 26 is attached to another insulating structure or spacer 28 secured to the fixed portion 21 of the gauge. Thus electrode 26 is fixed. On the other hand, electrode 27 is secured to the insulating bracket 15 which is the movable portion of the gauge. Accordingly the position of the electrodes 16 and 17 may be determined by the capacitance existing at any instant between the electrodes 26 and 27. It may be noted that electrode 27 preferably is of U-shape as shown and surrounds the electrode 26. The actual position of the sensing electrodes 16 and 17 may be determined either experimentally or by calculating the geometry of the two electrodes 26 and 27 forming the two plates of the capacitor having an air gap.

Figure 3:
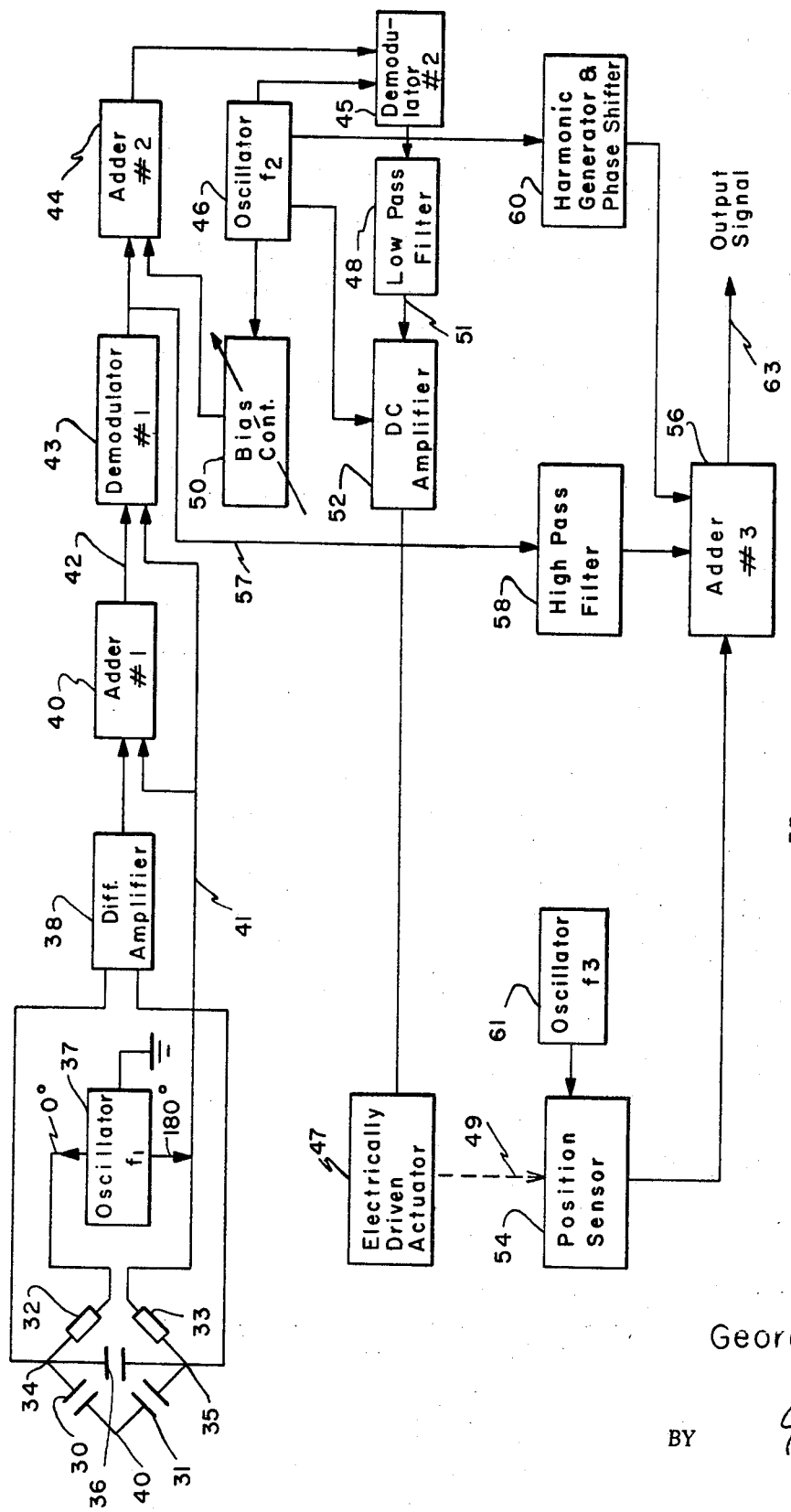
FIG. 3 is a schematic block diagram of an electronic system including an electrically driven actuator and a position sensor which may be used with any one of the gauges of the invention.

The operation of the gauge of FIGS. 1 and 2 will now be described by reference to FIG. 3, which is a block diagram of the electronic servosystem, the position sensor and the electrically driven actuator for the gauge of the invention. As shown in FIG. 3, there are two capacitors 30 and 31 which represent respectively the capacitance between electrode 16 and surface 14, and electrode 17 and surface 14. The two capacitors 30 and 31 form two arms of a bridge, the other two arms being formed by impedance elements 32 and 33 which have been shown schematically. These may, for example, be reactive impedance elements to balance the bridge.

The two corners 34 and 35 of the bridge are interconnected by another capacitor 36 which represents the stray capacitance existing between the two electrodes 16 and 17. This may include the capacitance of the wires connected to the electrodes and the like. It should be noted that the wires required to connect to the movable elements such as electrodes 16 and 17 should be so arranged that they will not mechanically vibrate and so as to minimize stray capacitance therebetween. As mentioned before, the magnitude of capacitor 36 is subject to change, for example by aging or variations of temperature.

Connected between the free ends of the two impedance elements 32 and 33 is an oscillator 37 which develops the carrier wave at a frequency $f_1$. As shown, the oscillator 37 is so arranged that it delivers two electric waves of opposite phase, that is, at 0° and 180° to the two impedance elements 32 and 33. This may, for example, consist of a center tapped inductor having the center tap grounded as schematically indicated.

This arrangement makes it possible to apply two electric waves of opposite phase to the two capacitors 30 and 31. Accordingly the difference in amplitude between the two waves may be detected by a differential amplifier 38 having its input connected to the bridge corners 34 and 35. It will be noted that the point 40 representing the junction between the two capacitors 30 and 31 is electrically balanced. Accordingly this point may be grounded if desired. Also if the gauge or the surface to be measured should pick up some stray electric potential it will not affect the operation of the gauge. It may also be pointed out that the bridge corner 35 may be grounded, which would result in a simplification of the circuitry.

The differential amplifier 38 has the purpose to add the two carrier waves of opposite phase obtained from the capacitance bridge. Therefore the output signal of the differential amplifier 38 is generally in the nature of an error signal.

The differential amplifier 38 combines the potentials obtained from the capacitors 30, 31 in such a way that the effects of the capacitors 30, 31 are individually added to develop the sensing or output signal. On the other hand the differential amplifier 38 cancels out any effect which the electric potential of the surface 14 to be measured may have. In addition it should be noted that the circuit of FIG. 3 permits both excitation of the gauge 12 and sensing of the distance by means of the same two electrodes 16, 17, that is, by means of the two capacitors 30 and 31.

Assuming that the surface 14 is quasi-stationary, the differential amplifier 38 produces an output signal which contains five separate components. The first component is the primary error signal. This takes the form of amplitude variations of the modulation sideband of the carrier wave by the subcarrier frequency. The second component may be called the first dielectric offset component. This takes the form of a constant amplitude of the modulation sideband of the carrier wave by the subcarrier frequency. The third component may be called the secondary error signal. This is represented by the amplitude of the carrier frequency component. This amplitude varies as a function of the quasi-motion of the surface. The fourth component is the second dielectric offset compound. This is represented by a constant amplitude voltage at the carrier frequency. The last or fifth component is the excitation component of the carrier wave. This is the voltage that is directly coupled from the excitation voltage source or oscillator 37 into the differential amplifier 38 through the circuit.

The output of the differential amplifier 38 is impressed on an adder #1 designated adder 40 on which is also impressed by a lead 41 one of the two waves from the oscillator or generator 37. The purpose of this arrangement is to eliminate the continuous wave portion of the carrier wave for a predetermined condition, such as a predetermined distance of the gauge 12 to the surface 14. As a result the error signal will vary above and below the zero value which simplifies the subsequent electronics. This is simply done by adding the carrier wave to the output of the differential amplifier 38 by means of adder 40. Stated another way, the adder #1 has the function to combine voltage components from the oscillator 37, that is, from the excitation frequency source, with the output of the differential amplifier 38. This, in first approximation, cancels out the second dielectric offset component and the excitation component of the carrier frequency referred to above. While the adder #1 is not essential to the operation of the gauge of the invention, it serves the purpose to reduce greatly the requirements for stability and lienearity placed on the differential amplifier 38 and the demodulator 43 to be presently described.

The adder #1 is now followed by a demodulator #1, designated demodulator 43, to which may also be fed one of the output waves of the oscillator 37 by means of lead 41 as shown. Preferably the demodulator 43 is a phase-sensitive discriminator. This will give added sensitivity and greater dynamic range to the servo-system. However, it is also feasible to utilize a simple amplitude detector or rectifier, in which case the output lead 41 from the oscillator 37 to both adder 40 and demodulator 43 may be omitted because the modulation signal of the carrier wave is directly detected by the rectifier. It is the purpose of the demodulator 43 to detect the signal developed by the adder #1. Therefore such a rectifier functions like the second detector of a superheterodyne broadcast receiver. The demodulator 43 eliminates any residue of the second dielectric offset component and of the excitation component of the carrier frequency.

The remaining three components previously referred to are processed by the demodulator 43. These three components are the primary error signal, the first dielectric offset component and the secondary error signal. After processing by the demodulator 43 the primary error signal is converted to an alternating-current voltat at the subcarrier frequency. This voltage varies in amplitude in accordance with changes of the distance between the surface 14 and the gauge 12, the dielectric constant of the medium between the electrodes and the surface and related effects.

The first dielectric offset component is converted to an alternating-current voltage at the subcarrier frequency. This voltage is constant in amplitude.

Finally, the secondary error signal is converted to a quasi-direct current voltage, that is, to a voltage which varies slowly. This voltage varies in accordance with the quasi-stationary distance between the surface 14 and the electrodes 16, 17.

The demodulator 43 is followed by adder #2, which has been designated adder 44, and the purpose of which will be presently explained. This is followed by a demodulator #2, which has been designated demodulator 45. The demodulator 43 detects the carrier wave $f_1$ The demodulator 45 detects the subcarrier wave $f_2$ which is generated by oscillator 46. This is the subcarrier which drives the electrically driven actuator schematically shown at 47. Accordingly the output of the demodulator #2 is essentially an error signal which may be passed through a low-pass filter 48. The low-pass filter 48 may be designed to remove the ripple caused by the demodulator 45. In addition the filter 48 provides proper stabilization of the closed servo loop. However, it is feasible that the actual output signal representing the distance between the electrodes 16, 17 and the surface 14 includes frequency components which are higher than the frequency bandwidth of the servosystem. In that case the filter 48 may be designed to remove harmonics of the oscillator frequency $f_2$ rather than the fundamental subcarrier frequency.

The oscillator 46 supplies a bias control 50 which has been shown schematically as being adjustable. This in turn has an output to the adder 44. The purpose of this is to make the output signal of adder 44 also zero when a predetermined distance has been reached between the sensing electrodes and the surface 14. This reduces the signal which must be handled by the demodulator 45. The bias control 50 is adjustable to adjust the desired distance.

Normally, that is, when the distance variation has a maximum frequency less than that of the passband of the servosystem, the error signal may be obtained from the output lead 51 of the low-pass filter 48. This error signal is then fed through a direct-current (DC) amplifier 52 into the electrically driven actuator 47. Also, the output of the oscillator 46 is fed into the DC amplifier 52. Accordingly the actuator 47 will vibrate the gauge 12 at the subcarrier frequency $f_2$ modulated by the error signal obtained from output lead 51.

As pointed out before, the actual position of the electrodes 16, 17 with respect to the surface 14, that is, in essence the distance which is to be measured, may be obtained directly from the actuator 47. However, generally a position sensor such as shown at 54 may be required. This may, for example, correspond to the electrodes 26, 27 of FIG. 1 which form a capacitor with an air gap, or any other suitable position sensor, and includes the electronic arrangement needed to develop a sensor output signal.

The position sensor 54 may be driven by the actuator 47, which is the arrangement shown in FIGS. 1 and 2. This is schematically indicated by the dotted line 49. In that case the output signal of the position sensor 54 is impressed by lead 55 onto adder #3, which has been designated adder 56. Another signal is added to adder #3 by lead 57 connected to the output of demodulator #1 and filtered by high-pass filter 58. For the sake of completeness it may be mentioned that the two error signals, namely, the primery error signal and the secondary error signal as processed by the demodulator 43 disagree by a constant even if the two signals are properly scaled. This constant is due to the presence of capacitor 36 of the bridge circuit. In order to eliminate this undesirable discrepancy, the high-pass filter 58 may be included.

Accordingly, the high-pass filter 58 will add the error signal from which only the carrier wave has been removed. This is only needed in case the frequency components of the final output signal are higher than the frequency response of the closed servo loop. In other words, since the bandwidth of the servosystem would cut off the desired high frequency components, the servosystem is in effect bypassed by adding the output signal of demodulator 43 to the signal obtained from the position sensor 54.

The signals processed by the demodulator 43, and in particular the primary error signal and the secondary error signal as converted by the demodulator 43 tend to approach zero at low frequencies, that is, when the distance between surface 14 and electrodes 16, 17 varies at a low rate and when the servo is operating. On the other hand, when the distance to be measured varies at frequencies much higher than the servo cutoff frequency, or if the error signal component is removed from the actuator 47, these two components are an indication of the instantaneous distance between the surface 14 and the electrodes 16, 17.

By adding the quasi-direct current voltage resulting from the secondary error signal to the position sensor 54 with a suitable gain factor, an output signal is obtained. At low frequencies this output signal is the servo position by itself and accordingly represents the distance signal. At high frequencies the output signal is the demodulator 43 output signal as described above. At intermediate frequencies this output signal is the true distance signal with a gradual transition from one basic mode to the other. In other words, the output signal is a combination of the two error components and provides the true distance measure. This is independent of the magnitude of the frequency variation of the distance between surface 14 and electrodes 16, 17 relative to the cutoff frequency of the servosystem.

In addition, an electric wave of a harmonic of the frequency $f_2$, which is the subcarrier frequency, may also be added to the adder #3 in case the frequency content of the variations of the distance exceeds the frequency response of the servo loop. To this end a harmonic generator and phase shifter 60 is connected between the output of oscillator 46 and another input of adder #3. This will then eliminate harmonics of the subcarrier frequency which may have passed into the system either through demodulator 45 or through the dither of the actuator 47. To this end the harmonic generator 60 may include a phase shifter to buck out or cancel such an undesired electric wave.

It will be recalled that the electrodes 16 and 17 are mechanically vibrated. As mentioned before, this serves the purpose of encoding the desired signal components obtained from the variations of the distance. Accordingly the position sensor 54 will also develop the same frequency output voltage. As mentioned before, this is a constant amplitude voltage at the subcarrier frequency. The fundamental of the subcarrier frequency is added through the phase shifter 60 to the adder #3 to buck out the position sensor subcarrier frequency voltage.

As a result, the only output voltage from added #3 is the true position voltage. This indicates the true position of the gauge 12 with respect to the surface 14 free of bias errors and extraneous alternating current voltages. However, some residual subcarrier harmonics may leak from the low-pass filter 48 through which the actuator 47 is driven. In that case these undesired subcarrier harmonics may be cancelled by adding a harmonic generator to the block 60 as shown, to provide harmonics of the subcarrier frequency.

As pointed out previously, the position sensor 54 may also be energized by an electromagnetic wave. For this purpose there may be provided still another oscillator 61 generating a frequency $f_3$ which serves the purpose to energize the position sensor, for example, the electrodes 26, 27 in FIG. 1.

The final output or position signal is obtained from output lead 63. Normally the voltage available from lead 51 does not indicate the true position of the gauge. The reason is that the servo loop tends to make the signal appearing on lead 51 as close to zero as possible. However, if the error signal component is not applied to the actuator 47, the voltage obtained at lead 51 is approximately representative of the true distance.

From the above description the operation of the gauge as illustrated in FIGS. 1 and 2 and of the electrical system of FIG. 3 will now be evident. The servosystem which vibrates mechanically the electrodes 16, 17 with respect to the fixed gauge portion 21 is driven by the oscillator 46 at the subcarrier frequency. Added to the subcarrier is the error signal obtained from lead 51. This error signal is representative of the average variation of the distance between electrodes 16, 17 and surface 14 from the nominal distance which is adjusted by the bias control 50. On the other hand, the actual average distance, that is, the distance without the mechanical vibratory movement, may be obtained from the output lead 51, or alternatively from the output lead 63, which is the actually sensed position.

If the surface 14 should be moving, such as the surface of a piece of insulating material which is being machined on a lathe, or a moving flat plate with surface irregularities, there may be high-frequency distance variations. As explained before, it is still feasible to obtain even such high-frequency variations from the output lead 63 even though the servosystem cannot follow that fast. Accordingly, in such a high-frequency output signal domain, the linearity of the scale factor accuracy is not as good as in the low-frequency signal domain where the servosystem is fully responsive. However, as distinguished from prior art systems, it is still feasible to obtain an indication of such high-frequency signals. These complications are much minimized if the output signal is within a low-frequency domain, that is, if the highest frequency is below that which can be passed by the servosystem.

Figure 4:
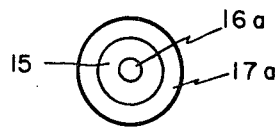
FIG. 4 is a front elevational view similar to that of FIG. 2 and illustrating a modified electrode arrangement.

Turning now to FIG. 4, there is illustrated a modified geometric arrangement of the two sensing electrodes. Accordingly the sensing electrode 16a may consist of a small circle, while the other electrode 17a may be ring-shaped, as shown, and may be concentric with the electrode 16a. In order to provide shielding between the two electrodes 16a, 17a, an electrically conducting shield between the electrodes may be provided. However, the outer electrode such as 17a does provide some inherent shielding from any adjacent structure provided the outer electrode is grounded or connected in a proper bridge circuit. Accordingly, this arrangement is also of value where it may be desirable to ground one of the two electrodes, corresponding to the grounding of the bridge corner 35 (FIG. 3) previously discussed.

Figure 5:
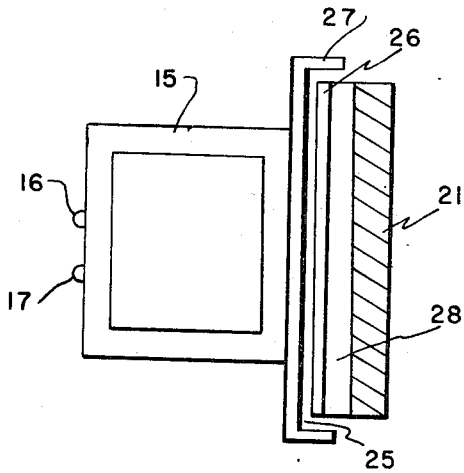
FIG. 5 is a schematic side elevational view of a modified capacitance gauge including a capacitive position sensor disposed directly between the movable and fixed portions of the instrument.

The gauge shown in FIG. 5 is similar to that of FIG. 1, but includes two relatively large position-sensing electrodes 26 and 27 forming a capacitance. Electrode 26 is again disposed on the insulating structure 28 secured to the fixed gauge portion 21. The movable electrode 27 is connected to the insulating bracket 15 on which the two measuring electrodes 16, 17 are disposed. The electrically driven actuator is not illustrated in FIG. 5 but may be identical to that of FIG. 1. In other words, a piezoelectric crystal may vibrate the insulating bracket 15 with respect to the fixed gauge portion 21.

In the gauge of FIG. 5, the position-sensing electrodes 26, 27 are relatively far removed from the measuring electrodes 16 and 17. In other words, the actuator or forcer is disposed between the measuring electrodes 16, 17 and the position-sensing electrodes 26, 27. This arrangement may give rise to errors because the distance to be measured is extremely small.

Figure 6:
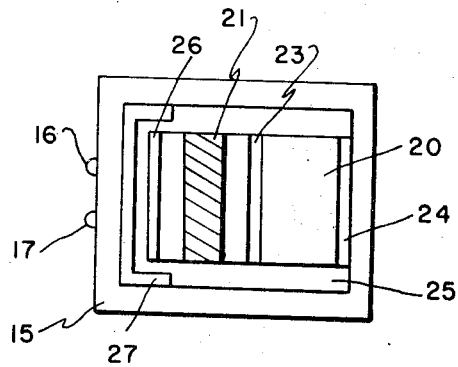
FIG. 6 is a schematic side elevational view of a further modified capacitance gauge in accordance with the invention and including a capacitive position sensor disposed adjacent to the sensing electrodes.

Accordingly the gauge of FIG. 6 may be preferred, where the position-sensing electrodes 26, 27 are positioned closely adjacent to the measuring electrodes 16, 17. Otherwise the arrangement is again similar to that of FIG. 1. The piezoelectric crystal 20 with its driving electrodes 23, 24 is arranged to the rear of the fixed gauge portion 21 and removed from the position-sensing electrodes 26, 27.

Figure 7:
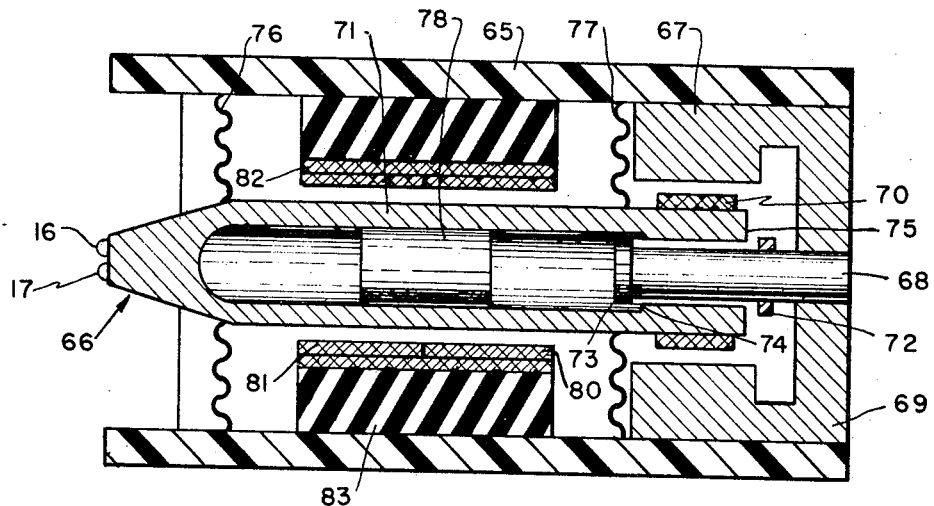
FIG. 7 is a schematic side elevational view of a further embodiment of the capacitance gauge of the invention utilizing a magnetically driven actuator and a magnetic differential transformer arrangement for sensing the position of the instrument.

Another type of capacitance gauge in accordance with the present invention is illustrated in FIG. 7. Here the measuring electrodes 16, 17 are vibrated by an electromagnetic arrangement similar to a conventional dynamic loudspeaker. The relatively fixed gauge portion is shown at 65 and may, for example, consist of a cylinder, as shown. The movable portion is generally shown at 66. The forcer or actuator includes a permanent magnet having an annular south pole 67 integral with a disc 69 and secured to the fixed gauge portion 65, and a rodlike north pole 68 extending from the disc 69. An electric winding 70 is disposed between the annular pole 67 and the rodlike pole 68 and driven at the subcarrier frequency $f_2$. The electric winding 70 is secured to a movable hollow cylindrical structure 71 having a conical front portion on which the sensing electrodes 16, 17 are mounted. Accordingly when the winding 70 is energized with an alternating current it will cause the cylindrical portion 71 to vibrate. A stop 72 may be secured on the rodlike north pole 68, and another stop 73 may be of disclike configuration secured to the free end of the north pole 68. A recess 74 in the cylindrical structure 71 engages the disc 73 while its rear end 75 engages the other stop 72 when the amplitude of vibration exceeds a desired value.

The movable structure 66 is suspended by a pair of bellows 76 and 77 secured to the fixed gauge portion 65. The bellows 76, 77 permit the movable portion 76 to vibrate.

The position sensor may consist of a differential transformer having a magnetic core 78 which may, for example, be disposed in the hollow portion of the movable cylinder 71. The differential transformer includes three fixed windings 80, 81 and 82. For example, the two windings 80 and 81 may be connected in series, while an alternating current is applied to the winding 82. Relative movement between the fixed windings 81, 82 and the movable magnetic core 78 causes an unbalance of the transformer and accordingly generates an output signal. The windings 80 to 82 may be secured on an insulating annular structure 83 secured in turn to the fixed gauge portion 65. The winding 82 may, for example, be driven by the oscillator 61 shown in FIG. 3.

Figure 10:
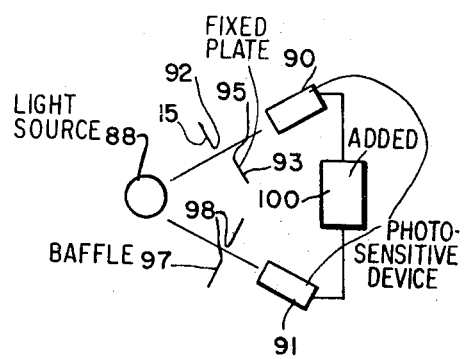
FIG. 10 is a schematic view illustrating a second photocell and slot for eliminating variations of the intensity of the light used with the gauge of FIGS. 8 and 9.

Another type of electrically driven actuator as well as a different embodiment of a position sensor are illustrated in connection with the gauge of FIGS. 8 through 10, to which reference is now made. In this gauge the actuator or forcer consists of a rod 85 of magnetostrictive material. The rod 85 is secured to the fixed gauge portion 21 and is driven by an electric winding 86. This will cause elongation or constriction of the rod 85 in accordance with the electric voltage applied to the winding 86. The winding 86 may again be energized by the oscillator 61 shown in FIG. 3. The relatively movable portion includes again the insulating bracket 15 on which the measuring electrodes 16 and 17 are mounted. The bracket 15 is secured to the magnetostrictive rod 85 for movement therewith.

Figure 8:
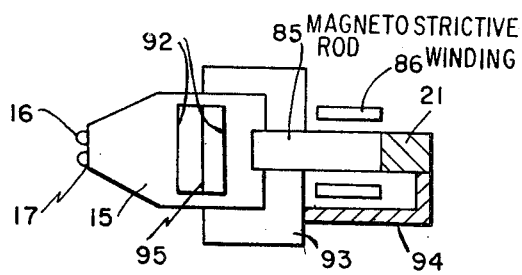
FIG. 8 is a schematic side elevational view of a capacitance gauge with a magnetostrictive actuator and a photocell arrangement for sening the position thereof.
Figure 9:
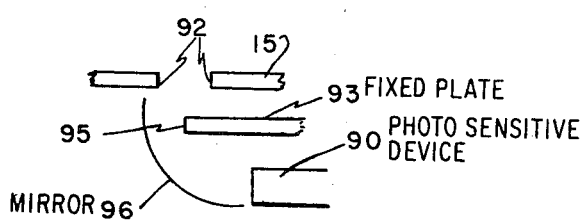
FIG. 9 is a sectional view of the capacitance gauge of FIG. 8 to show the movable slot and photocell for determining the position of the gauge.

The position sensor of the gauge of FIG. 8 includes a light source 88 (see FIG. 10) and a pair of photosensitive devices 90 and 91, such as photocells, photomultipliers or the like. The insulating bracket 15 is provided with a slot 92 through which the light from the light source 88 shines. A fixed plate 93 is fixed by the bracket 94 to the fixed gauge portion 21 and has an edge 95 which normally bisects the slot 92. Accordingly the light from the light source 88 falls through the slot 92 and past the edge 95 onto a curved mirror 96, which serves to integrate the light and pass it into the photocell 90.

It will accordingly be evident that the amount of light falling into the photocell 90 is a direct function of the relative position of the slot 92 with respect to the fixed edge 95.

In order to eliminate variations of the intensity of the light source 88, a second photocell 91 may be provided. A portion of the light from light source 88 falls onto the photocell 91 through a baffle 97 having a slot 98.

The outputs of the two photocells 90 and 91 are subtracted from each other by the adder 100, as shown schematically. Accordingly the output of the adder 100 is a direct indication of the position of the electrodes 16, 17 regardless of variations of the intensity of the light source 88.

There has thus been disclosed a capacitance gauge for measuring extremely small distances between a surface and the gauge. The capacitance gauge has two measuring electrodes on which a carrier wave is impressed. Additionally, the gauge is mechanically vibrated with respect to a fixed portion. This will modulate the variations of the capacitance between each measuring electrode and the surface. On the other hand, the capacitance which represents stray capacitance and other undesirable effects is not modulated in the first order and hence can be readily distinguished from the others and its effect can be eliminated. Various means have been disclosed to vibrate the gauge by a piezoelectric crystal, a magnetostrictive rod or magnetically. The position of the gauge may be sensed directly by the driven actuator. Preferably a special position sensor is provided which may also be capacitative; it may consist of a differential transformer or a photosensitive differential arrangement. The gauge of the invention remains operative even when the surface to be measured moves so that the frequency content of the output signal is higher than the passband of the servosystem.

What is claimed is:
1. A precision capacitance gauge for measuring relatively small distances between a surface and a gauge comprising:
   (a) a first fixed portion;
   (b) a second portion movable with respect to said first portion;
   (c) a first pair of electrodes on said movable portion for detecting the distance to the surface, said electrodes being disposed closely adjacent to each other;
   (d) a first generator for developing two electrical carrier waves out of phase with respect to each other, each being coupled to one of said electrodes for determining variations of the dielectric between said electrodes and the surface;
   (e) an electrically drivable actuator connected between said portions for mechanically vibrating said second portion;
   (f) a second generator for developing a subcarrier wave and coupled to said actuator for driving it;
   (g) a position sensor coupled between said fixed and movable portions for sensing the instantaneous position of said second portion, said position sensor including a second additional pair of electrodes, each being fixed to one of said portions, said additional electrodes providing a capacitance between one another, said capacitance varying with the position of said portions;
   (h) a servosystem including said actuator and said second generator for tending to maintain to the average distance between said surface and said first pair of electrodes constant; and
   (i) means for deriving an output signal representative of the actual distance to be determined, coupled to said additional pair of electrodes and to said servosystem.

2. A gauge as defined in claim 1 wherein said second pair of electrodes is disposed adjacent said first pair of electrodes for sensing the distance to the surface.

3. A precision capacitance gauge for measuring relatively small distances between a surface and the gauge comprising:
   (a) a first fixed portion;
   (b) a second portion movable with respect to said first portion;
   (c) a pair of electrodes on said movable portion for detecting the distance to the surface, said electrodes being disposed closely adjacent to each other;
   (d) a first generator for developing two electrical carrier waves out of phase with respect to each other, each being coupled to one of said electrodes for determining variations of the dielectric between said electrodes and the surface;

(e) an electrically drivable actuator connected between said portions for mechanically vibrating said second portion;

(f) a second generator for developing a subcarrier wave and coupled to said actuator for driving it;

(g) a position sensor coupled between said fixed and said movable portion for sensing the instantaneous position of said second portion, said position sensor including a permanent magnet and differential transformer means coupled between said portions;

(h) a servosystem including said actuator and said second generator for tending to maintain the average distance between said surface and said electrodes constant; and (i) means for deriving an output signal representative of the actual distance to be determined coupled to said position sensor and to said servosystem.

4. A gauge as defined in claim 3 wherein said permanent magnet is fixed to said second portion and said differential transformer means to said first portion.

5. A precision capacitance gauge for measuring relatively small distances between a surface and the gauge comprising:

(a) a first fixed portion;

(b) a second portion movable with respect to said first portion;

(c) a pair of electrodes on said movable portion for detecting the distance to the surface, said electrodes being disposed closely adjacent to each other;

(d) a first generator for developing two electrical carrier waves out of phase with respect to each other, each being coupled to one of said electrodes for determining variations of the dielectric between said electrodes and the surface;

(e) an electrically drivable actuator connected between said portions for mechanically vibrating said second portion;

(f) a second generator for developing a subcarrier wave and coupled to said actuator for driving it;

(g) a position sensor coupled between said fixed portion and said movable portion for sensing the instantaneous position of said movable portion, said position sensor including a fixed light source, an element secured to said fixed portion, said element having an edge, a slot in said second portion movable with respect to said edge, whereby the light from said light source passes through said slot and is intercepted by said edge, and photoelectric means disposed for detecting the variation in intensity of light passing through said slot, the light intensity varying with the relative position of said slot with respect to said fixed element;

(h) a servosystem including said actuator and said second generator for tending to maintain the average distance between said surface and said electrodes constant; and (i) means for deriving an output signal representative of the actual distance to be determined coupled to said position sensor and to said servosystem.

6. A capacitance gauge for precisely measuring relatively small distances between a surface and said gauge, said gauge comprising:

(a) a first fixed portion;

(b) a second portion movable with respect to said first portion;

(c) a pair of electrodes disposed on said movable portion closely adjacent to each other for detecting the distance to the surface, each electrode when energized providing a capacitance between itself and the surface;

(d) a servo-system including an electrically drivable actuator connected between said portions for mechanically vibrating said electrodes;

(e) means providing a bridge circuit including the variable capacitance between each of said electrodes and the surface;

(f) a first generator for developing an electric carrier wave and impressing it on said bridge circuit;

(g) a second generator for developing an electrical subcarrier wave and impressing it on said actuator;

(h) means including a differential amplifier coupled to said bridge circuit for developing a signal representative of the instantaneous position of said electrodes with respect to the surface;

(i) a first demodulator coupled to said means for developing for demodulating said signal to derive a first error signal;

(j) a second domodulator coupled to said first demodulator and to said second generator for demodulating the subcarrier wave to derive a second error signal;

(k) means coupling said second demodulator and said second generator to said actuator for driving it to vibrate the gauge and for maintaining substantially constant the average distance between said electrodes and the surface;

(l) a position sensor disposed between said portions for sensing the position of said pair of electrodes;

(m) an adder connected between said position sensor and the output of said first demodulator for mixing the position sensor signal with said first error signal and for deriving an output signal; and (n) means for impressing the subcarrier wave from said second generator on said adder, whereby said output signal is indicative of the mean distance between said pair of electrodes and the surface even when the frequency of the variation of the distance exceeds the bandwidth of the servosystem.

7. A capacitance gauge as defined in claim 6 wherein a third generator is provided for developing an electromagnetic wave, said third generator being coupled to said position sensor for impressing the wave on said position sensor to derive a modulated wave therefrom.

8. A capacitance gauge as defined in claim 6 wherein a low-pass filter is coupled between said second demodulator and said actuator for limiting the passband of said servosystem to relatively low frequencies.

References Cited

UNITED STATES PATENTS

| | | | |
|---|---|---|---|
| 1,946,924 | 2/1934 | Allen et al. | 324—40 X |
| 2,874,470 | 2/1959 | Richards. | |
| 2,968,031 | 1/1961 | Higa | 340—265 |
| 3,114,257 | 12/1963 | Foster et al. | 73—45.5 |
| 3,263,167 | 7/1966 | Foster et al. | 324—61 |
| 3,379,972 | 4/1968 | Foster et al. | 324—61 |
| 3,400,331 | 9/1968 | Harris | 324—61 |

EDWARD E. KUBASIEWICZ, Primary Examiner